(12) United States Patent
Marcelli et al.

(10) Patent No.: US 11,259,340 B2
(45) Date of Patent: Feb. 22, 2022

(54) MANAGEMENT OF A HOME GATEWAY WITH MOBILE CONNECTIVITY TO A WIDE AREA NETWORK

(71) Applicant: Telecom Italia S.p.A., Milan (IT)

(72) Inventors: Maurizio Marcelli, Rome (IT); Fabio Ricciato, Turin (IT)

( * ) Notice: Subject to any disclaimer, the term of this patent is extended or adjusted under 35 U.S.C. 154(b) by 0 days.

(21) Appl. No.: 16/651,658

(22) PCT Filed: Sep. 26, 2018

(86) PCT No.: PCT/EP2018/076045
§ 371 (c)(1),
(2) Date: Mar. 27, 2020

(87) PCT Pub. No.: WO2019/063579
PCT Pub. Date: Apr. 4, 2019

(65) Prior Publication Data
US 2020/0314921 A1 Oct. 1, 2020

(30) Foreign Application Priority Data
Sep. 27, 2017 (IT) .................... IT102017000108358

(51) Int. Cl.
*H04W 4/00* (2018.01)
*H04W 76/10* (2018.01)
(Continued)

(52) U.S. Cl.
CPC ............ *H04W 76/10* (2018.02); *H04L 12/66* (2013.01); *H04W 4/80* (2018.02); *H04W 8/18* (2013.01);
(Continued)

(58) Field of Classification Search
CPC ....... H04W 76/10; H04W 88/16; H04W 8/18; H04W 4/80; H04W 64/003; H04W 64/00; H04L 12/66
(Continued)

(56) References Cited

U.S. PATENT DOCUMENTS 7,319,878 B2 * 1/2008 Sheynblat ............... G01S 19/48
455/456.3
8,750,098 B2 * 6/2014 Fan ........................ H04W 40/02
370/225
(Continued)

FOREIGN PATENT DOCUMENTS

FR 2810837 A1 12/2001
GB 2480406 A 11/2011

OTHER PUBLICATIONS

Oct. 19, 2018—(WO) International Search Report, including Written Opinion of the ISA—App PCT/EP2018/076045.

*Primary Examiner* — Marceau Milord
(74) *Attorney, Agent, or Firm* — Banner & Witcoff, Ltd.

(57) ABSTRACT

It is disclosed a method and system for managing a home gateway with mobile connectivity to a WAN, wherein a management server activates the home gateway only if its current position matches a location to which use of the home gateway shall be bound as selected by the user. In order to select such location, a client application executed by the personal mobile device of the user requests the user to place the personal mobile device next to the home gateway and detect its own current position. The client application then requests the user to confirm that the detected current position of the personal mobile device is the location to which use of the home gateway shall be bound. The detected current position of the personal mobile device is then sent to the
(Continued)

management server, which uses it to determine whether the home gateway may be activated.

18 Claims, 3 Drawing Sheets

(51) Int. Cl.
    *H04W 4/80*         (2018.01)
    *H04L 12/66*       (2006.01)
    *H04W 8/18*         (2009.01)
    *H04W 64/00*       (2009.01)
    *H04W 84/12*       (2009.01)
    *H04W 88/16*       (2009.01)

(52) U.S. Cl.
    CPC .......... *H04W 64/003* (2013.01); *H04W 84/12* (2013.01); *H04W 88/16* (2013.01)

(58) Field of Classification Search
    USPC ......................................... 370/338, 331, 329
    See application file for complete search history.

(56) References Cited

U.S. PATENT DOCUMENTS

| | | | | |
|---|---|---|---|---|
| 9,407,624 B1* | 8/2016 | Myers | ..................... | H04L 41/28 |
| 9,445,270 B1* | 9/2016 | Bicket | ..................... | H04W 4/80 |
| 9,474,076 B2* | 10/2016 | Fan | ........................ | H04W 88/16 |
| 9,756,047 B1* | 9/2017 | Batchu | .................. | H04L 63/102 |
| 9,942,783 B2* | 4/2018 | Fan | ........................ | H04W 24/00 |
| 9,948,548 B2* | 4/2018 | Gandhi | .................... | H04L 45/28 |
| 10,034,149 B2* | 7/2018 | Gandhi | ................. | H04W 88/12 |
| 10,051,597 B2* | 8/2018 | Haynes | ............... | H04W 64/003 |
| 2006/0009235 A1 | 1/2006 | Sheynblat et al. | | |
| 2008/0188243 A1* | 8/2008 | Giustina | ............... | H04W 60/00 |
| | | | | 455/456.6 |
| 2009/0097476 A1* | 4/2009 | Roux | .................... | H04W 88/16 |
| | | | | 370/352 |
| 2010/0122338 A1 | 5/2010 | Kataoka et al. | | |
| 2010/0210280 A1 | 8/2010 | Haynes et al. | | |
| 2012/0026865 A1* | 2/2012 | Fan | ........................ | H04W 24/00 |
| | | | | 370/225 |
| 2013/0329714 A1* | 12/2013 | Fan | ........................ | H04W 48/00 |
| | | | | 370/338 |
| 2014/0068030 A1* | 3/2014 | Chambers | ........... | H04L 41/0809 |
| | | | | 709/220 |
| 2014/0235261 A1* | 8/2014 | Fan | ........................ | H04W 24/04 |
| | | | | 455/452.1 |
| 2017/0008162 A1* | 1/2017 | Tsubota | .................. | G05B 19/00 |
| 2017/0034718 A1* | 2/2017 | Fan | ........................ | H04W 40/02 |
| 2017/0115123 A1* | 4/2017 | Kang | .................... | G01C 21/206 |
| 2018/0139593 A1* | 5/2018 | Chun | ..................... | H04W 4/12 |
| 2018/0139796 A1* | 5/2018 | Beijar | .................. | H04W 76/16 |

* cited by examiner

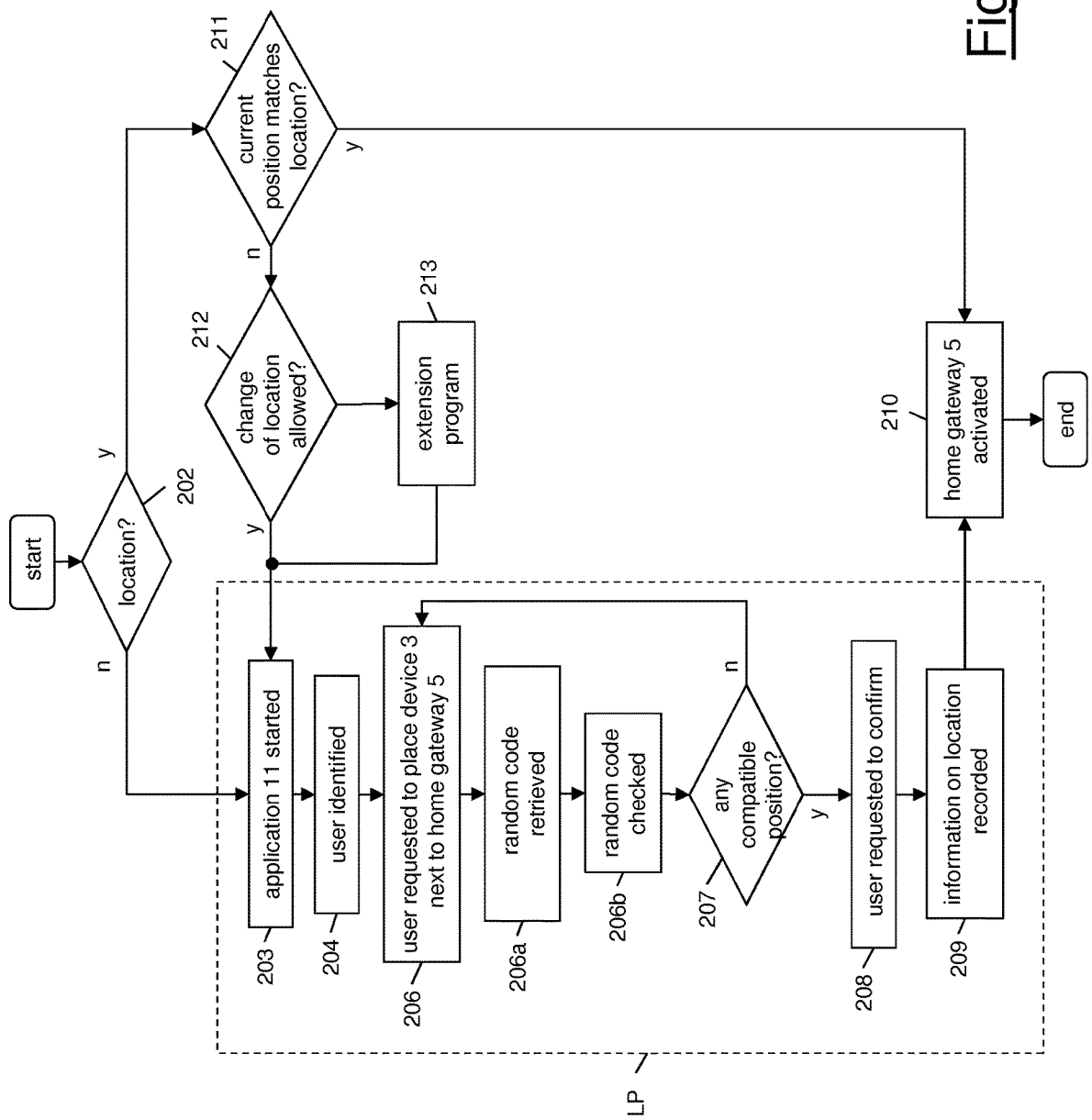

MANAGEMENT OF A HOME GATEWAY WITH MOBILE CONNECTIVITY TO A WIDE AREA NETWORK

TECHNICAL FIELD

The present invention relates to the field of communication networks. In particular, the present invention relates to a method and system for managing a home gateway with mobile connectivity to a wide area network (WAN).

BACKGROUND ART

As known, a home gateway is a device located at a user's premises which allows the user to access—by means of user's terminals (e.g. smartphones, computers, tablets, smart TVs, etc.)—fixed broadband services, namely broadband services which may be accessed only at a predefined fixed location (typically, the users home).

On the user side, a home gateway provides wired (e.g. Ethernet) and/or wireless (e.g. Wi-Fi) connectivity to the user terminals. On the network side, the home gateway is typically connected to a wide area network (WAN) by means of a broadband connection.

Such broadband connection may be a wired connection, e.g. an optical fibre connection or an ADSL (Asymmetric Digital Subscriber Line) connection.

Home gateways are also known which are connected to the WAN by means of wireless broadband connections, in particular mobile broadband connections (HSPA, LTE, WiMAX, etc.). Such home gateways are typically used to provide users with fixed broadband services in areas where wired broadband connections to WANs are not available (e.g. low density population areas, rural areas, etc.), or to allow users to use a same home gateway in different locations.

FR 2 810 837 describes a system for verifying the position of a mobile telephone having a SIM card. The SIM card has a position finding application that, in a learning mode, registers RF parameters of the surrounding environment. In a later verification mode, the RF parameters are measured again and compared with the registered values. This allows binding use of the mobile telephone to a certain location (e.g. his/her premises).

SUMMARY OF THE INVENTION

The Applicant has noticed that a home gateway with a mobile broadband connection to a WAN, which is used to provide a user with fixed broadband services, should be managed so that the user is allowed to:
  (i) use the home gateway only in a certain predefined location (home address) or, at most, in a short list of predefined locations (home address, seaside house, etc.) and/or
  (ii) change the predefined location(s) only for a very limited number of times.

This way, the user would be prevented from misusing the home gateway, e.g. using it to access broadband services from any desired location as if it were a mobile device while—at the same time—enjoying a tariff plan for fixed services, which is typically cheaper than tariff plans for mobile services.

The Applicant has therefore perceived the need to provide a method and system for managing a home gateway with mobile connectivity to a WAN which—similarly to the known method of FR 2 810 837—binds use of the home gateway to one or more locations at the choice of the user.

The Applicant has considered that such binding first of all requires that the user somehow selects the location(s) to which use of the home gateway shall be bound. The user could select the location(s) upon signing of the contract for the provision of the fixed broadband services, e.g. during a call with the customer care service, or in written form, or by manually selecting the location(s) on a map displayed on a web page of the mobile network provider. The mobile network provider then centrally manages the home gateway so that it is enabled to operate only at the selected location. Alternatively, the installation of the home gateway at the users premises could be performed by a field operator, who configures the home gateway so that it is enabled to operate only at the installation location.

The Applicant has noticed that these mechanisms for allowing the user to select the location(s) to which use of the home gateway shall be bound may be inconvenient for both the user and the network operator, in that a number of operations are required on both sides.

Such operations moreover take time, and therefore disadvantageously delay the activation of the home gateway.

Moreover, in case the user wishes to change the location (s) to which use of the home gateway shall be bound (e.g. due to a change of address), the procedure for the location change is quite complex, in that it requires sending a location change request to the mobile network provider and/or receiving a further visit of a field operator to reconfigure the home gateway at the new location.

In view of the above, the Applicant has tackled the problem of providing a method and system for managing a home gateway with mobile connectivity to a wide area network which guarantees that use of the home gateway is bound to a certain location selected by the user and, at the same time, which allows the user to select the location to which use of the home gateway shall be bound without having to perform any complex or lengthy operation that may delay activation of the home gateway and allows the user to change the location (for a limited number of times) in a convenient way.

According to embodiments of the present invention, the above problem is solved by a method and system for managing a home gateway with mobile connectivity to a wide area network, wherein a management server receives from the home gateway its current position and activates it only if the current position of the home gateway matches a previously selected location to which use of the home gateway shall be bound. In order to allow the user performing such selection, a personal mobile device of the user (namely, a personal device provided with autonomous mobile connectivity with the mobile communication network, such as the user's smartphone) requests the user to place the personal mobile device next to the home gateway and detects its own current position. The personal mobile device then requests the user to confirm that its detected current position is the location to which use of the home gateway shall be bound. In the affirmative, the personal mobile device sends its detected current position to the management server, which will then use it as the previously selected location to which use of the home gateway shall be bound, for determining whether to activate the home gateway or not, as described above.

The method and system of the present invention, therefore, advantageously guarantees that use of the home gateway is bound to the location selected by the user, while allowing the user to select the location to which use of the home gateway shall be bound without having to perform any complex or lengthy operation.

The user indeed only has to briefly interact with her/his personal mobile device (e.g. her/his smartphone provided with a suitable app), i.e. bring it close to the home gateway and confirm that the current position of the personal mobile device as automatically detected by the device itself is the location to which use of the home gateway shall be bound. Such operations are particularly easy and simple for the user, who is typically very familiar with her/his personal mobile device and its functions.

On the other hand, as soon as the user has given her/his confirmation, the location to which use of the home gateway shall be bound is automatically sent to the management server, which then may readily activate the home gateway. The home gateway therefore becomes activated without the need to wait any installation operation by field operators.

Moreover, in case the user wishes to change the location to which use of the home gateway shall be bound (e.g. due to a change of address), she/he simply has to interact again with her/his personal mobile device, in order to provide the management server with the new current position of the personal mobile device (of course, in order to avoid misuses of the home gateway by the user, such procedure may be repeated only for a limited number of times).

According to a first aspect, the present invention provides a method for managing a home gateway with mobile connectivity to a wide area network, the method comprising, at a management server:
receiving a current position of the home gateway; and
activating the home gateway if the received current position of the home gateway matches a previously selected location to which use of the home gateway shall be bound,
wherein previous selection of the location to which use of the home gateway shall be bound comprises, at a personal mobile device of a user of the home gateway:
a) requesting the user to place the personal mobile device next to the home gateway and detecting a current position of the personal mobile device;
b) requesting the user to confirm that the detected current position of the personal mobile device is the location to which use of the home gateway shall be bound; and
c) in the affirmative, sending the detected current position of the personal mobile device to the management server, which uses it as the previously selected location to which use of the home gateway shall be bound.

According to first embodiments, before step a), the user of the personal mobile device is associated with the home gateway, the associating comprising storing an association between a unique identifier $ID_U$ of the user and a unique identifier $ID_{HG}$ of the home gateway in a home gateway database accessible by the management server.

Preferably, after step a), the method comprises determining one or more home gateways associated with the user, determining whether, amongst the one or more home gateways associated with the user, there is a home gateway whose current position is compatible with the current position of the personal mobile device and:
in the negative, repeating step a); and
in the affirmative, performing step b).

According to other embodiments, the method comprises, before step a):
requesting the personal mobile device to retrieve a random code from the home gateway;
comparing the random code as retrieved from the personal mobile device with an expected random code;
if the retrieved random code matches the expected random code, performing steps a), b) and c); and
if the retrieved random code does not match the expected random code, preventing execution of steps a), b) and c).

Preferably, retrieving the random code from the home gateway comprises:
reading the random code from a display of the home gateway and manually inputting the read random code at the personal mobile device;
transmitting the random code from the home gateway to the personal mobile device by means of a short range connection between the home gateway and the personal mobile device; or
automatically acquiring the random code in the form of a QR code or barcode, shown by the home gateway, by means of a camera of the personal mobile device.

Preferably, steps a), b) and c) are performed by a client application executed by the personal mobile device and interacting with the management server.

Optionally, the client application is automatically started by the management server as the management server determines that no location to which use of the home gateway shall be bound has been selected yet.

Preferably, steps a), b) and c) are performed if it is determined that no location to which use of the home gateway shall be bound has been selected yet.

Preferably, the method further comprises, if the received current position of the home gateway does not match the previously selected location to which use of the home gateway shall be bound, checking whether the user is allowed to change the location to which use of the home gateway shall be bound and, in the affirmative, repeating steps a), b) and c).

Preferably, checking whether the user is allowed to change the location to which use of the home gateway shall be bound comprises:
increasing a counter each time steps a), b) and c) are successfully concluded for the home gateway;
each time a location change is requested for the home gateway, comparing the counter with a predefined maximum number Nmax of location changes; and
as far as the counter is not higher than Nmax, allowing a location change for the home gateway and repeating steps a), b) and c).

Optionally, if it is determined that the user is no more allowed to change the location to which use of the home gateway shall be bound, an extension program is started, which comprises payment of an extra-cost by said user for a further location change.

Optionally, the method further comprises checking that the personal mobile device is periodically brought next to the home gateway and allowing the home gateway continuing being active only in the affirmative.

Optionally, step c) further comprises showing on a display of the personal mobile device a map where an area in which the home gateway is allowed to operate is graphically indicated.

According to a second aspect, the present invention provides a system for managing a home gateway with mobile connectivity to a wide area network, the system comprising a management server configured to:
receive a current position of the home gateway; and
activate the home gateway if the received current position of the home gateway matches a previously selected location to which use of the home gateway shall be bound, the system further comprising a client application suitable for being executed by a personal mobile device of a user of the home gateway and to implement previous selection of the location to which use of the home gateway shall be bound, the client application being configured to:

a) request the user to place the personal mobile device next to the home gateway and detect a current position of the personal mobile device;
b) request the user to confirm that the detected current position of the personal mobile device is the location to which use of the home gateway shall be bound; and
c) in the affirmative, send the detected current position of the personal mobile device to the management server, which uses it as the previously selected location to which use of the home gateway shall be bound.

According to a third aspect, the present invention provides computer program product loadable in the memory of at least one computer and including software code portions for performing the steps of the method as set forth above, when the product is run on at least one computer.

BRIEF DESCRIPTION OF THE DRAWINGS

The present invention will become clearer from the following detailed description, given by way of example and not of limitation, to be read with reference to the accompanying drawings, wherein:

FIG. 3 is a flow chart of the operation of the system shown in FIG. 1 according to a second variant of the present invention.

DETAILED DESCRIPTION OF PREFERRED EMBODIMENTS OF THE INVENTION

Figure 1:
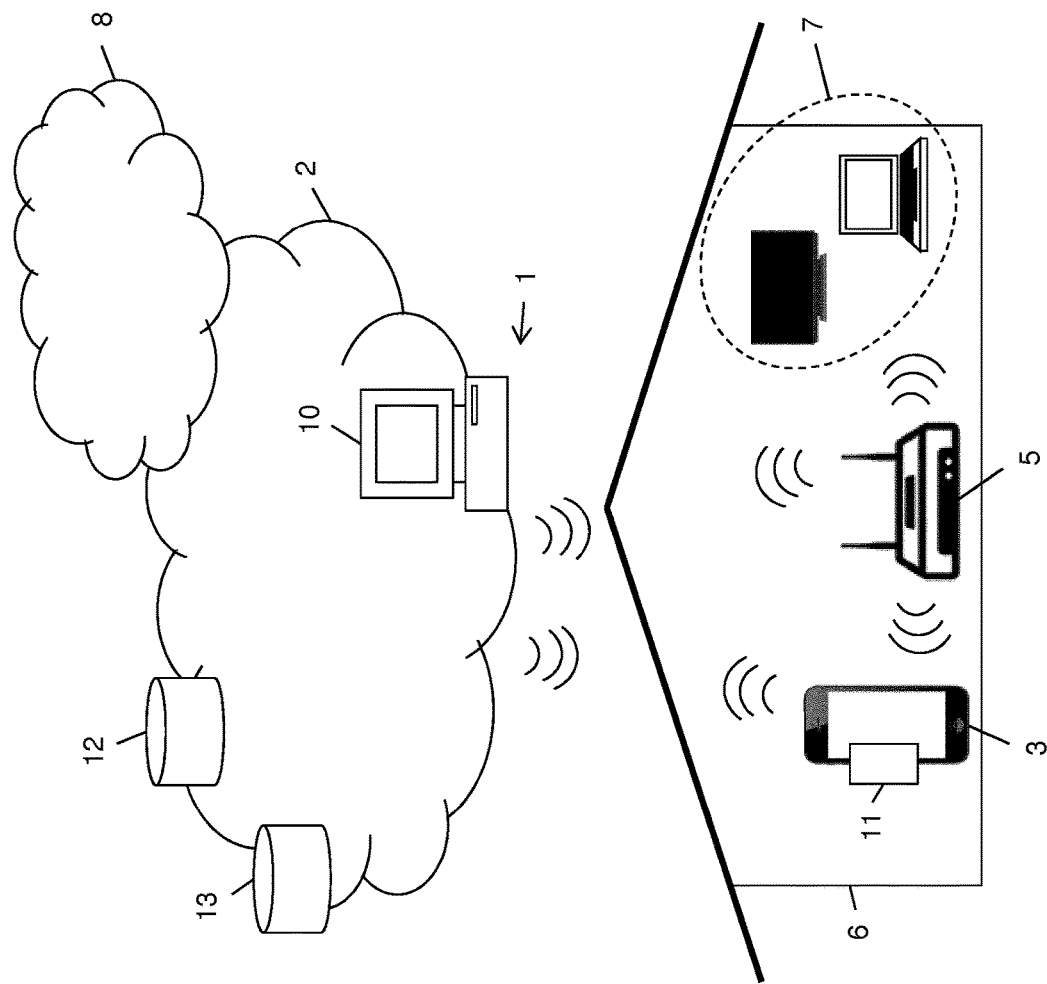
FIG. 1 schematically shows a system for managing home gateways according to an embodiment of the present invention.

FIG. 1 schematically shows a system 1 for managing home gateways according to an embodiment of the present invention.

The management system 1 preferably comprises a management server 10 cooperating with a mobile communication network 2. The management server 10 may be implemented within the infrastructure of the mobile communication network 2.

The system 1 also preferably comprises a client application 11 suitable for being installed on a personal mobile device 3 of a user, wherein the expression "personal mobile device" indicates a personal device of the user, which is provided with autonomous mobile connectivity with the mobile communication network 2. The personal mobile device 3 may be for instance the user's smartphone. The client application 11 is preferably configured to, when executed by the personal mobile device 3, interact with the management server 10 via the mobile communication network 2, for the purpose of providing the management server 10 with information allowing the management server 10 to properly manage home gateways, as it will be described in detail herein after. The client application 11 may be e.g. an app downloadable by the personal mobile device 3 from an app online store (iTunes Store, Google Play, etc.).

The system 1 also preferably comprises one or more databases. In particular, the system 1 preferably comprises:

a user database 12 storing information about the users registered at the mobile communication network 2. For each registered user, the user database 12 may store personal user data, type of contract and a unique user identifier such as, for instance, her/his MSISDN (Mobile Subscriber ISDN Number); and a home gateway database 13 storing information on the home gateways managed by the system 1, as it will be described in detail herein after.

Figure 2:
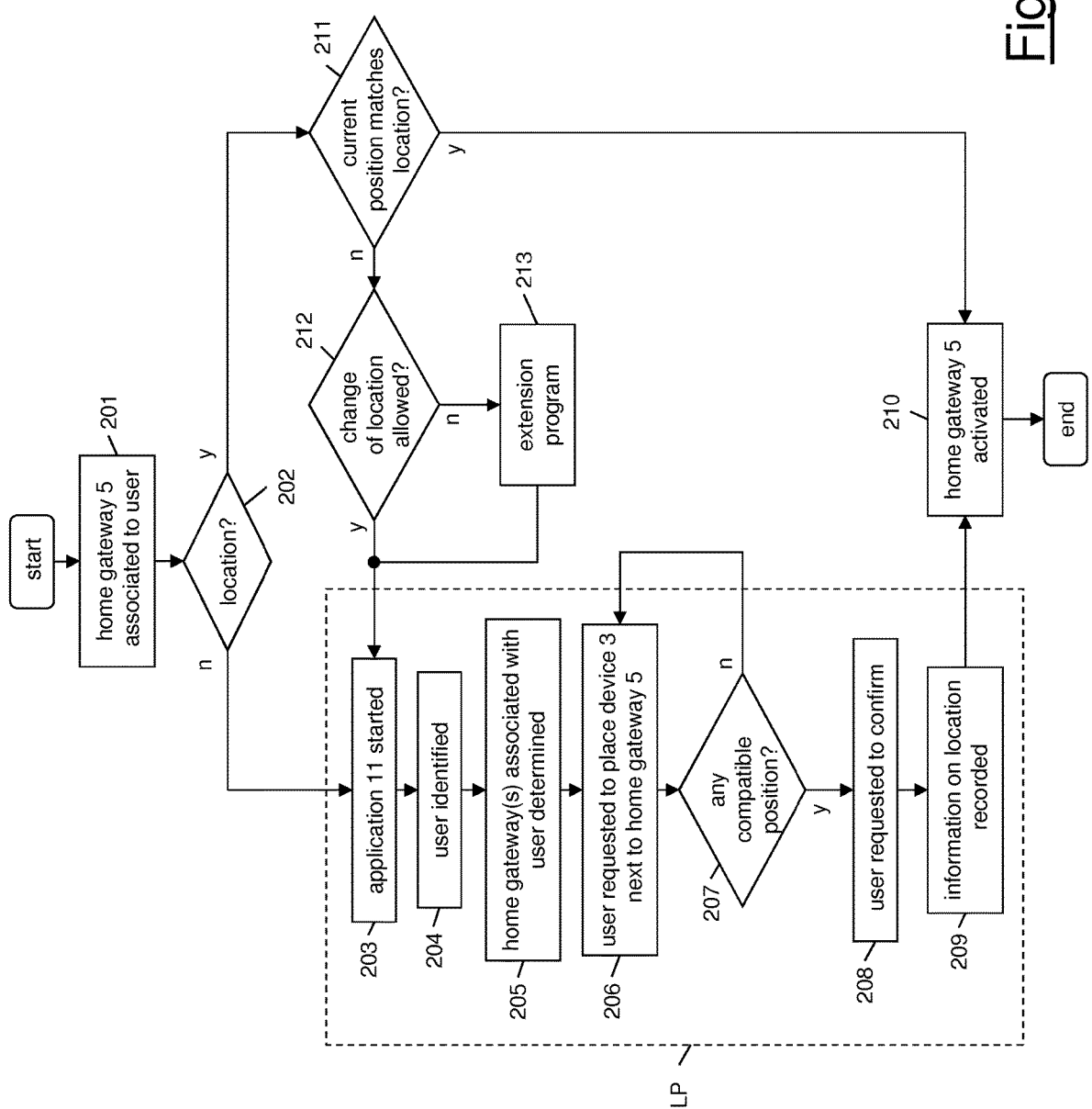
FIG. 2 is a flow chart of the operation of the system shown in FIG. 1 according to a first variant of the present invention.

The operation of the system 1 and its components according to a first variant of the present invention will be now described in detail, with reference to the flow chart of FIG. 2.

First of all, the user buys a home gateway 5, either in a shop or via an ecommerce site. According to the first variant, as the user buys the home gateway 5, the home gateway 5 is preferably associated with the user (step 201). In case the home gateway 5 is bought in a shop, the association between user and home gateway 5 may be performed at the desk of the shop. Alternatively, the user may perform the association later, e.g. from a web page of the mobile network provider. In particular, at step 201 an association between a unique identifier $ID_U$ of the user and a unique identifier $ID_{HG}$ of the home gateway 5 is preferably recorded in the home gateway database 13.

For instance, the unique identifier $ID_U$ of the user may comprise:

the MSISDN (phone number) of the user;
a username that identifies the user within the infostructure of the mobile network provider;
a username that identifies the user within the infostructure of an external identity provider trusted by the mobile network provider (e.g. eiDAS, OpenID Connect servers, etc.); or
an identifier derived from the hardware identifier or software identifier of the personal mobile device 3.

Moreover, the unique identifier $ID_{HG}$ of the home gateway 5 may comprise:

the MSISDN (phone number) of the SIM card included in the home gateway 5 for connectivity to the mobile communication network 2;
a predetermined identifier already stored in the home gateway database 13; or
an identifier derived from the hardware identifier or software identifier of the home gateway 5.

Then, the user preferably places the home gateway 5 at a desired location, such as her/his premises 6, and switches it on. As the home gateway 5 is switched on, it connects to the mobile communication network 2 by means of a wireless broadband connection, in particular a mobile broadband connections such as, for example, an HSPA, LTE or WiMAX connection.

As the home gateway 5 is connected to the mobile communication network 2, the management server 10 preferably checks whether the user has already selected a location to which use of the home gateway 5 shall be bound (step 202). For the purpose of making this check, the management server 10 preferably retrieves from the home gateway 5 its unique identifier $ID_{HG}$ and uses it for retrieving in the home gateway database 13 any information relating to the home gateway 5 which might be stored therein. The management server 10 then preferably checks whether such information specifies any location to which use of the home gateway 5 shall be bound.

In the negative (which is typically the case, when the home gateway 5 is switched on for the first time), the system 1 preferably starts a location procedure LP.

In order to allow the system 1 starting the location procedure LP, the above mentioned client application 11 is started at the personal mobile device 3 of the user (step 203). In case the personal mobile device 3 is managed by a device management system, the management server 10 may force the start of the client application 11 onto the personal mobile device 3. Otherwise, the client application 11 may be started manually.

Then, the client application 11 preferably identifies the user (step 204). To this purpose, the client application 11 preferably retrieves the unique identifier $ID_U$ of the user from the personal mobile device 3.

Then, according to the first variant, the management server 10 preferably determines the home gateway(s) associated with the user (step 205). To this purpose, the client application 11 preferably sends the unique identifier $ID_U$ of the user retrieved at step 204 to the management server 10, which then uses it for reading from the home gateway database 13 the unique identifier(s) of the home gateway(s) associated therewith, including the unique identifier $ID_{HG}$ of the home gateway 5 (the user may have associated other home gateways, in addition to the home gateway 5).

The client application 11 then preferably requests the user to place the personal mobile device 3 next to the home gateway she/he wishes to activate, namely the home gateway 5 (step 206).

The management server 10 then preferably determines whether—amongst the home gateways associated with the user—there is any home gateway whose current position is compatible with that of the personal mobile device 3 (step 207).

To this purpose, the management server 10 preferably requests to both the personal mobile device 3 and the home gateway(s) associated with the user (including the home gateway 5) to detect their respective current positions. To detect their respective positions, such devices may use any known technique, such as for instance determine the identifier of the cell of the mobile communication network 2 in which they are located. The management server 10 in this case concludes that the home gateway 5 has a current position compatible with that of the personal mobile device 3 if the cell identifier determined by the home gateway 5 matches the cell identifier determined by the personal mobile device 3. Alternatively, a triangulation technique may be used, by which the home gateway(s) associated with the user and the personal mobile device 3 of the user infer their geographical coordinates. In such case, the management server 10 preferably concludes that the home gateway 5 has a current position compatible with that of the personal mobile device 3 if the distance between their geographical coordinates is below a certain maximum distance.

If none of the home gateways associated with the user has a current position compatible with that of the personal mobile device 3, the management server 10 preferably instructs the client application 11 to revert to step 206, namely request again the user to place the personal mobile device 3 next to the home gateway that she/he wishes to activate.

If, instead, the management server 10 determines that a home gateway associated with the user has a current position compatible with that of the personal mobile device 3 (which is the home gateway 5, since the user has brought the personal mobile device 3 next to it), the management server 10 preferably instructs the client application 11 to request to the user a confirmation that the current position of the personal mobile device 3 (and of the home gateway 5, which is next to it) is the location to which use of the home gateway 5 shall be bound (step 208).

At step 208, the client application 11 may also show on the display of the personal mobile device 3 a map where the area in which the home gateway 5 will be allowed to operate is graphically indicated. The client application 11 then preferably transmits the confirmation to the management server 10, which records in the home gateway database 13—next to the already recorded unique identifier $ID_{HG}$ of the home gateway 5 and the unique identifier $ID_U$ of the user to which it is associated—the location to which use of the home gateway 5 shall be bound as selected by the user (step 209), namely the current position of the personal mobile device 3.

The management server 10 then preferably activates the home gateway 5 (step 210). This way, as far as it remains at the location to which its use is bound as selected by the user, the home gateway 5 may provide wireless connectivity (e.g. via Wi-Fi) and/or wired connectivity (e.g. Ethernet) to a plurality of user terminals 7 (such as smartphones, smart-TVs, tables, PCs, etc.) including the personal mobile device 3 itself, and connect them to a WAN 8 through the mobile access network 2, to provide such user terminals with fixed broadband communication services.

The system 1, therefore, advantageously guarantees that the home gateway 5 is used only at the location selected by the user, while allowing the user to select the location to which use of the home gateway 5 shall be bound without having to perform any complex or lengthy operation.

The user indeed only has to briefly interact with her/his personal mobile device 3, i.e. bring it next to the home gateway 5 (step 206) and confirm that the current position of the personal mobile device 3 as automatically detected by the device 3 itself is the location to which use of the home gateway 5 shall be bound (step 208). Such operations are particularly easy and simple for the user, who is typically very familiar with her/his personal mobile device 3 and its functions.

On the other hand, as soon as the user has given her/his confirmation, the location to which use of the home gateway 5 shall be bound is automatically sent to the management server 10, which then may readily activate the home gateway 5 (step 210). The home gateway 5 therefore becomes activated without the need to wait any installation operation by field operators.

If, at step 202, the management server 10 determines that the user has already selected a location to which use of the home gateway 5 shall be bound (which is the case when the above described location procedure LP has already been performed for the home gateway 5), the management server 10 preferably checks whether the current position of the home gateway 5 matches the location to which use of the home gateway 5 shall be bound as stored in the home gateway database 13 (step 211).

To this purpose, the management server 10 preferably retrieves from the home gateway 5 its current position as detected by the home gateway 5 itself. Again, in order to detect its own position, the home gateway 5 may use any known technique, including e.g. determination of the identifier of the cell in which it is located, or a triangulation technique providing its current position in terms of geographical coordinates. The home gateway 5 then preferably sends its detected current position to the management server 10, which compares it with the location to which use of the home gateway 5 shall be bound as stored in the home gateway database 13.

If the current position of the home gateway 5 as detected by the home gateway 5 itself matches the location to which use of the home gateway 5 shall be bound, the management server 10 directly goes to step 210, namely it activates the home gateway 5.

In the negative, according to preferred embodiments, the management server 10 preferably checks whether the user is allowed to change the location to which use of the home gateway 5 shall be bound (step 212).

To this purpose, a predefined number Nmax of location changes may be decided by the mobile network provider, e.g. Nmax=2. Each time a location procedure LP as described above is performed for the home gateway 5, the management server 10 preferably increases a counter, which is preferably also stored in the home gateway database 13 together with the other information on the home gateway 5. The counter value is increased by one each time a location procedure LP for the home gateway 5 is successfully concluded. Each time a location procedure LP is requested for the home gateway 5, the value of the counter is compared with Nmax. As far as the counter value is not higher than Nmax, the management server 10 concludes that a change of location is allowed. Otherwise, the management server 10 concludes that no further changes of location are allowed.

This allows preventing misuse of the home gateway 5 by the user who, in the absence of such limitation to the location changes, could e.g. use the home gateway 5 for accessing broadband services as if it were a mobile device, by simply repeating the above described location procedure LP as she/he moves from a location to another location.

If, at step 212, the management server 10 determines that a change of location is allowed, the management system 1 starts a new location procedure LP, namely it reverts to step 203 (start of the client application 11 on the personal mobile device 3).

Otherwise (no further changes of location allowed), the management system 1 may activate an extension program (step 213). Such extension program may provide, for instance, the payment of an extra-cost by the user for each change of location exceeding Nmax. As the user complies with the requirements of the extension program, the management system 1 starts a new location procedure LP, namely it reverts to step 203 (start of the client application 11 on the personal mobile device 3).

Therefore, advantageously, when the user wishes to change the location to which use of the home gateway 5 shall be bound (e.g. due to a change of address), she/he simply has to interact again with her/his personal mobile device 3 (and comply with the requirements of the extension program, where applicable), in order to provide the management server 10 with the new current position of the personal mobile device 3. The location change procedure is therefore convenient for the user and does not entail any delay in the re-activation of the home gateway 5 at the new location.

Preferably, the system 1 executes the steps of the flow chart of FIG. 2:
  each time the home gateway 5 is switched on, in order to verify that the user does not switch off the home gateway 5, transfer it to another non authorized location and then switch it on again; and/or
  periodically (for instance, every 60 minutes) while the home gateway 5 is active, in order to verify that the user does not displace the home gateway 5 to another non authorized location during its operation.

Optionally, while the home gateway 5 is operating at the location selected by the user as described above, the management server 10:
  checks that the personal mobile device 3 is periodically brought (e.g. once a month or once a week) next to the home gateway 5; and
  allows the home gateway 5 continuing being active only in case of positive outcome of this check.

This helps preventing the user e.g. from activating the home gateway 5 on behalf of a third party at the third party's premises by using her/his own personal mobile device 3.

FIG. 3 is a flow chart of the operation of the management system 1 according to a second variant of the present invention.

According to such second variant, as the user buys the home gateway 5, the home gateway 5 is not associated with the user, namely step 201 of FIG. 2 is omitted. Hence, differently from the first variant, before the first location procedure LP is performed, the home gateway database 13 does not store any association between the unique identifier $ID_U$ of the user and the unique identifier $ID_{HG}$ of the home gateway 5.

According to the second variant, as the home gateway 5 is switched on, it connects to the mobile communication network 2 and the system 1 performs steps 202-204 described above, namely: the central server 10 checks whether the user has already selected a location to which use of the home gateway 5 shall be bound (step 202) and, in the negative, a location procedure is started by the user, who manually starts the client application 11 at his/her personal mobile device 3 (step 203), so that the client application 11 identifies the user (step 204).

Then, according to this second variant, since the home gateway database 13 still does not store any association between unique identifier $ID_U$ of the user and unique identifier(s) of home gateway(s) associated therewith, the management server 10 does not perform the above described step 205 of determining the home gateway(s) associated with the user.

Instead, according to the second variant, after it has requested to the user to bring the personal mobile device 3 next to the home gateway 5 (step 206 described above), the client application 11 preferably requests the personal mobile phone 3 to retrieve a random code from the home gateway 5 (step 206a).

The home gateway 5 may be pre-configured with the random code upon manufacturing, the random code in such case being known to the management server 10 and being preferably stored in the home gateway database 13 together with the unique identified $ID_{HG}$—Alternatively, the random code may be generated by the home gateway 5 upon its switching on. In this case, the home gateway 5 preferably sends the random code to the management server 10 after it has generated it, together with its unique identifier $ID_{HG}$, so that the management server 10 may record both the random code and the unique identifier $ID_{HG}$ in the home gateway database 13.

The home gateway 5 may provide the random code to the personal mobile device 3 in different ways. For instance:
  the random code may be shown on a display of the home gateway 5. The user may read it and manually input it at the personal mobile device 3; or
  the random code may be transmitted by the home gateway 5 to the personal mobile device 3 via an NFC (Near Field Communication) transceiver; or the random code may be transmitted by the home gateway 5 to the personal mobile device 3 via the UPnP (Universal Plug and Play) protocol; or the random code may be in the form of a static or dynamic QR code or barcode (printed on the home gateway casing or shown on a display of the home gateway), which the user may acquire by means of the camera of the personal mobile device 3.

After the personal mobile device 3 has retrieved the random code from the home gateway 5, it preferably sends it to the management server 10, which checks it (step 206b). In particular, the management server 10 preferably checks whether the random code as received from the personal mobile device 3 of the user corresponds to the random code as previously stored in the home gateway database 13 (step 206b). If the two random codes do not match, the management sever 10 preferably instructs the client application 11 to stop the location procedure LP and inform the user, e.g. by means of a text message shown on the display of the personal mobile device 3 (step not shown in the drawings). If instead the two random codes match, then the home gateway 5 is associated with the user, namely an association between the unique identifier $ID_U$ of the user and the unique identifier $ID_{HG}$ of the home gateway 5 is recorded in the home gateway database 13.

In case of positive outcome of the check 206b, the system 1 preferably completes the location procedure LP by performing steps 207-209 described above, namely: the management server 10 checks whether the current position of the home gateway 5 is compatible with the current position of the personal mobile device 3 (step 207); in the affirmative, the client application 11 requests the user to confirm that the current position of the personal mobile device 3 is the location to which use of the home gateway 5 shall be bound (step 208); and the confirmation is sent to the management server 10 (step 209), which eventually activates the home gateway 5 (step 210).

Also according to the second variant of FIG. 2, if at step 202 the management server 10 determines that the user has already selected the location to which use of the home gateway 5 shall be bound, the management server 211 preferably checks whether the current position of the home gateway 5 matches the location to which use of the home gateway 5 shall be bound (step 211). In the affirmative, the management server 10 preferably activates the home gateway 5 (step 210). Otherwise, according to preferred embodiments the management server 10 preferably checks whether a change of location is allowed (step 212). In the affirmative, it starts a new location procedure (steps 203-209) and then activates the home gateway 5 at the new location (step 210). Otherwise, it may activate an extension program (step 213) as described above.

The method and system of the present invention, therefore, advantageously guarantees that use of a home gateway is bound to the location selected by its user, while allowing the user to select the location to which use of the home gateway shall be bound without having to perform any complex or lengthy operation.

The user indeed only has to briefly interact with her/his personal mobile device (e.g. her/his smartphone provided with a suitable app), i.e. bring it close to the home gateway and confirm that the current position of the personal mobile device as automatically detected by the device itself is the location to which use of the home gateway shall be bound. Such operations are particularly easy and simple for the user, who is typically very familiar with her/his personal mobile device and its functions.

On the other hand, as soon as the user has given her/his confirmation, the location to which use of the home gateway shall be bound is automatically sent to the management server, which then may readily activate the home gateway. The home gateway therefore becomes activated without the need to wait any installation operation by field operators.

Moreover, in case the user wishes to change the location to which use of the home gateway shall be bound (e.g. due to a change of address), she/he simply has to interact again with her/his personal mobile device, in order to provide the management server with the new current position of the personal mobile device (of course, in order to avoid misuses of the home gateway by the user, such procedure may be repeated only for a limited number of times).

The invention claimed is:

1. A method for managing a home gateway with mobile connectivity to a wide area network, said method comprising, at a management server:
   receiving a current position of said home gateway; and
   activating said home gateway based on the received current position of said home gateway matching a previously selected location to which use of said home gateway shall be bound,
   wherein previous selection of the location to which use of said home gateway shall be bound comprises, at a personal mobile device of a user of said home gateway:
   a) requesting the user to place said personal mobile device next to said home gateway and detecting a current position of said personal mobile device;
   b) requesting the user to confirm that the detected current position of said personal mobile device is the location to which use of said home gateway shall be bound; and
   c) based on the user confirmation, sending the detected current position of said personal mobile device to said management server, which uses the detected current position as said previously selected location to which use of said home gateway shall be bound.

2. The method according to claim 1, comprising, before step a), associating the user of said personal mobile device with said home gateway, the associating comprising storing an association between a unique identifier of the user and a unique identifier of said home gateway in a home gateway database accessible by said management server.

3. The method according to claim 2, comprising, after step a), determining one or more home gateways associated with the user, determining whether, amongst said one or more home gateways associated with the user, there is a home gateway whose current position is compatible with the current position of said personal mobile device and:
   in the negative, repeating step a); and
   in the affirmative, performing said-step b).

4. The method according to claim 1, comprising, before step a):
   requesting said personal mobile device to retrieve a random code from said home gateway;
   comparing the random code as retrieved from said personal mobile device with an expected random code;
   if the retrieved random code matches the expected random code, performing steps a), b) and c); and
   if the retrieved random code does not match the expected random code, preventing execution of steps a), b) and c).

5. The method according to claim 4, wherein retrieving the random code from said home gateway comprises:

reading the random code from a display of said home gateway and inputting the read random code at said personal mobile device;

transmitting the random code from said home gateway to said personal mobile device via a short range connection between said home gateway and said personal mobile device; or acquiring the random code as a QR code or barcode, shown by said home gateway, by a camera of said personal mobile device.

6. The method according to claim 1, wherein steps a), b) and c) are performed by a client application executed by said personal mobile device and interacting with said management server.

7. The method according to claim 6, wherein said client application is started by said management server based on no location having been selected to which use of said home gateway shall be bound.

8. The method according to claim 1, wherein steps a), b) and c) are performed based on determining that no location has been selected to which use of said home gateway shall be bound.

9. The method according to claim 1, further comprising:
determining that said personal mobile device is periodically brought next to said home gateway, and
allowing said home gateway to continue being active based on determining that said personal mobile device is periodically brought next to said home gateway.

10. The method according to claim 1, wherein step c) further comprises showing on a display of said personal mobile device a map where an area in which said home gateway is allowed to operate is graphically indicated.

11. A system for managing a home gateway with mobile connectivity to a wide area network, said system comprising a management server configured to:
receive a current position of said home gateway; and
activate said home gateway if the received current position of said home gateway matches a previously selected location to which use of said home gateway shall be bound,
said system further comprising a client application executable by a personal mobile device of a user of said home gateway and to implement previous selection of the location to which use of said home gateway shall be bound, said client application being configured to:
a) request the user to place said personal mobile device next to said home gateway and detect a current position of said personal mobile device;
b) request the user to confirm that the detected current position of said personal mobile device is the location to which use of said home gateway shall be bound; and
c) based on the user confirmation, send the detected current position of said personal mobile device to said management server, which uses the detected current position as the previously selected location to which use of said home gateway shall be bound.

12. The system according to claim 11, wherein the management server is further configured to:
if the received current position of said home gateway does not match the previously selected location to which use of said home gateway shall be bound, determining whether the user is allowed to change the location to which use of said home gateway shall be bound and, based on determining that the user is allowed to change the location, repeating said steps a), b) and c).

13. The system according to claim 12, wherein determining whether the user is allowed to change the location to which use of said home gateway shall be bound comprises:
increasing a counter each time said steps a), b) and c) are successfully concluded for said home gateway;
each time a location change is requested for said home gateway, comparing said counter with a predefined maximum number of location changes; and
if said counter is not higher than the predefined maximum number of location changes, allowing a location change for said home gateway and repeating steps a), b) and c).

14. The system according to claim 13, wherein, if it is determined that the user is not allowed to change the location to which use of said home gateway shall be bound, an extension program is started, which comprises payment of an extra-cost by the user for a further location change.

15. A non-transitory computer readable medium storing computer readable instructions that, when executed by at least one computing device, cause a management server to perform steps comprising:
receiving a current position of a home gateway connected to a wide area network; and
activating said home gateway if the received current position of said home gateway matches a previously selected location to which use of said home gateway shall be bound,
wherein previous selection of the location to which use of said home gateway shall be bound comprises, at a personal mobile device of a user of said home gateway:
a) requesting the user to place said personal mobile device next to said home gateway and detecting a current position of said personal mobile device;
b) requesting the user to confirm that the detected current position of said personal mobile device is the location to which use of said home gateway shall be bound; and
c) based on the user confirmation, sending the detected current position of said personal mobile device to said management server, which uses the detected current position as said previously selected location to which use of said home gateway shall be bound.

16. The non-transitory computer readable medium according to claim 15, wherein the management server is further configured to:
if the received current position of said home gateway does not match the previously selected location to which use of said home gateway shall be bound, determining whether the user is allowed to change the location to which use of said home gateway shall be bound and, based on determining that the user is allowed to change the location, repeating said steps a), b) and c).

17. The non-transitory computer readable medium according to claim 16, wherein determining whether the user is allowed to change the location to which use of said home gateway shall be bound comprises:
increasing a counter each time said steps a), b) and c) are successfully concluded for said home gateway;
each time a location change is requested for said home gateway, comparing said counter with a predefined maximum number of location changes; and
if said counter is not higher than the predefined maximum number of location changes, allowing a location change for said home gateway and repeating steps a), b) and c).

18. The non-transitory computer readable medium according to claim 17, wherein, if it is determined that the user is not allowed to change the location to which use of said home gateway shall be bound, an extension program is started, which comprises payment of an extra-cost by the user for a further location change.

* * * * *